(12) United States Patent
Guynn

(10) Patent No.: US 10,526,248 B2
(45) Date of Patent: Jan. 7, 2020

(54) WHITE CEMENTITIOUS COMPOSITIONS

(71) Applicant: ROMAN CEMENT, LLC, Salt Lake City, UT (US)

(72) Inventor: John M. Guynn, Salt Lake City, UT (US)

(73) Assignee: ROMAN CEMENT, LLC, Salt Lake City, UT (US)

(*) Notice: Subject to any disclaimer, the term of this patent is extended or adjusted under 35 U.S.C. 154(b) by 73 days.

(21) Appl. No.: 15/951,108

(22) Filed: Apr. 11, 2018

(65) Prior Publication Data

US 2018/0230057 A1    Aug. 16, 2018

Related U.S. Application Data

(63) Continuation-in-part of application No. PCT/US2018/015567, filed on Jan. 26, 2018, and a continuation-in-part of application No. 15/598,132, filed on May 17, 2017, now Pat. No. 9,957,196.

(60) Provisional application No. 62/451,533, filed on Jan. 27, 2017, provisional application No. 62/337,424, filed on May 17, 2016.

(51) Int. Cl.
```
C04B 28/04      (2006.01)
C04B 14/42      (2006.01)
C04B 20/00      (2006.01)
```

(52) U.S. Cl.
CPC .............. *C04B 28/04* (2013.01); *C04B 14/42* (2013.01); *C04B 20/0048* (2013.01); *C04B 2201/52* (2013.01); *C04B 2235/5212* (2013.01); *C04B 2235/5232* (2013.01); *C04B 2235/5409* (2013.01); *C04B 2235/963* (2013.01); *C04B 2237/38* (2013.01)

(58) Field of Classification Search
CPC ..... C04B 28/04; C04B 14/42; C04B 20/0048; C04B 2201/52; C04B 2235/5212; C04B 2235/963; C04B 2235/5232; C04B 2235/5409; C04B 2237/38
See application file for complete search history.

(56) References Cited

U.S. PATENT DOCUMENTS

| | | |
|---|---|---|
| 7,799,128 B2 | 9/2010 | Guynn et al. |
| 7,972,432 B2 | 7/2011 | Guynn et al. |
| 8,323,399 B2 | 12/2012 | Guynn et al. |
| 8,377,201 B2 | 2/2013 | Guynn et al. |
| 8,414,700 B2 | 4/2013 | Guynn et al. |
| 8,551,245 B2 | 10/2013 | Guynn et al. |
| 8,974,593 B2 | 3/2015 | Guynn et al. |
| 9,067,824 B1 | 6/2015 | Hansen et al. |
| 9,102,567 B1 | 8/2015 | Hansen et al. |
| 9,238,591 B2 | 1/2016 | Guynn et al. |
| 9,272,953 B2 | 3/2016 | Guynn et al. |
| 9,957,196 B1 | 5/2018 | Guynn |

OTHER PUBLICATIONS

U.S. Appl. No. 15/598,132, filed May 17, 2017, Office Action dated Oct. 31, 2017.

*Primary Examiner* — Anthony J Green
(74) *Attorney, Agent, or Firm* — Workman Nydegger

(57) ABSTRACT

A cementitious composition includes (i) white Portland cement having a fineness of about 350-550 $m^2/kg$, D90 between about 11-50 μm, and total combined iron oxide, manganese oxide, and chromium oxide <1.0% by weight (ii) light color pozzolan such as white silica fume, and (iii) at least one light color particulate material, such as ground granulated blast furnace slag (GGBFS) having a fineness greater than that of the white Portland cement, a D90 less than that of the white Portland cement, and total combined iron oxide, manganese oxide, and chromium oxide content <3.0% by weight and/or coarse limestone powder having a D90 greater than that of the white cement. The cementitious composition may include one or more of aggregates, fibers, or admixture. The cementitious composition can be a dry blend, fresh cementitious mixture, or hardened cementitious composition. The cementitious composition can be precast concrete, stucco, GFRC, UHPC or SCC.

20 Claims, No Drawings

WHITE CEMENTITIOUS COMPOSITIONS

CROSS REFERENCE TO RELATED APPLICATIONS

This Application is a continuation-in-part of International Patent Application No. PCT/US2018/015567, filed Jan. 26, 2018, and a continuation-in-part of U.S. patent application Ser. No. 15/598,132, filed May 17, 2017, now U.S. Pat. No. 9,957,196, which claims the benefit of U.S. Provisional Patent Application No. 62/451,533, filed Jan. 27, 2017, and U.S. Provisional Patent Application No. 62/337,424, filed May 17, 2016, the disclosures of which are incorporated herein by reference in their entirety.

BACKGROUND

1. Field of the Invention

The invention is in the field of hydraulic cement and cementitious compositions made with hydraulic cement.

2. Technology Review

Modern Portland cement is a ubiquitous building material that when mixed with water forms a flowable or moldable material and then hardens or cures to form a hardened cementitious binding matrix. Portland cement is typically grey in color owing to the inclusion of iron oxide, typically in the form of the clinker mineral tetracalcium aluminoferrite ($C_4AF$), which can act as a flux to bind the other main clinker minerals together (i.e., tricalcium silicate ($C_3S$), dicalcium silicate ($C_2S$), and tricalcium aluminate ($C_3A$)), which typically melt at higher temperature.

White Portland cement (or "white cement") is a specialty cement used when the grey color of grey Portland cement is undesirable. The whiteness of white Portland cement powder is measured by its reflectance value ("L value") and qualifies as "white" when the L value exceeds 85%. Often, the whiteness of cement, limestone and other powders is expressed as "brightness". White cement can be used in combination with white or light colored aggregates to produce white or light concrete for prestige construction projects and decorative work. White, light or other decorative concrete can take the form of pre-cast cladding panels, stucco finishes, or glass fiber reinforced concrete (GFRC) since it is generally not economical to use white cement for purely structural elements. An exception is ultrahigh performance concrete (UHPC) which, by nature is very expensive, and which is often made using white cement for both aesthetics and performance.

White cement has little initial pigmentation and can therefore be used with inorganic pigments to produce colored concretes and mortars or almost any desired color. Grey cement, when used with pigments, produces colors that may be attractive but can also be somewhat dull because of grey background color. With white cement, bright reds, yellows and greens can be readily and more reliably produced. Pigments can be added to the cementitious mixture when mixed. Alternatively, to guarantee repeatable color, some manufacturers supply ready-blended colored cements using white cement as a base.

SUMMARY

Disclosed herein are cementitious compositions comprising dry blends, fresh cementitious mixtures, or hardened cementitious compositions comprised of mixture products of white Portland cement, a light color pozzolan, such as white silica fume, metakaolin, ground pumice, ground volcanic ash, or other light color natural pozzolan, and at least one other light color particulate material, such as relatively high brightness ground granulated blast furnace slag (GGBFS), Class C fly ash, and/or ground limestone powder. The cementitious compositions may also include aggregates, fibers, admixtures, or other components known in the art of concrete.

A dry blended cementitious composition comprises white Portland cement, light color pozzolan, and at least one other light color particulate material selected from GGBFS, Class C fly ash, and ground limestone powder. The white Portland cement, light color pozzolan, and at least one other light color particulate material are advantageously processed separately and without intergrinding in order to control their respective particle size distributions (PSDs).

A fresh cementitious mixture comprises water, white Portland cement, light color pozzolan, the at least one other light color particulate material, and optionally one or more additional components.

A hardened cementitious composition comprises reaction products of a fresh cementitious mixture comprising water, white Portland cement, light color pozzolan, at least one other light color particulate material, and optionally one or more additional components.

These and other features of the present invention will become more fully apparent from the following description and appended claims, or may be learned by the practice of the invention as set forth hereinafter.

DETAILED DESCRIPTION

Disclosed are cementitious compositions comprising dry blends, fresh cementitious mixtures, and hardened cementitious compositions comprised of mixture products of white Portland cement, a light color pozzolan, and at least one other light color particulate material. The cementitious compositions may also include aggregates, fibers, admixtures, or other components known in the art of concrete.

In some embodiments, a dry blended cement composition comprises:
  white Portland cement having a Blaine fineness between about 350 $m^2$/kg and about 550 $m^2$/kg, a D90 between about 11 μm and about 50 μm, and a total combined iron oxide, manganese oxide, and chromium oxide content of less than 1.0% by weight;
  at least one light color pozzolan selected from white silica fume, metakaoline, ground pumice, and ground volcanic ash and having a Blaine fineness greater than the Blaine fineness of the white Portland cement, a D90 less than the D90 of the white Portland cement, and a total combined iron oxide, manganese oxide, and chromium oxide content of less than 3.0% by weight; and
  at least one light color particulate material selected from ground granulated blast furnace slag (GGBFS), Class C fly ash, ground limestone powder, and ground marble.

In some embodiments, a cementitious mixture comprises mixture products of:
  water;
  white Portland cement having a Blaine fineness between about 350 $m^2$/kg and about 550 $m^2$/kg, a D90 between about 11 μm and about 50 μm, and a total combined iron oxide, manganese oxide, and chromium oxide content of less than 1.0% by weight;

at least one light color pozzolan selected from white silica fume, metakaoline, ground pumice, and ground volcanic ash and having a Blaine fineness greater than the Blaine fineness of the white Portland cement, a D90 less than the D90 of the white Portland cement, and a total combined iron oxide, manganese oxide, and chromium oxide content of less than 3.0% by weight; and at least one light color particulate material selected from ground granulated blast furnace slag (GGBFS), Class C fly ash, ground limestone powder, and ground marble.

In some embodiments, a hardened cementitious composition comprises reaction products of:

water;

white Portland cement having a Blaine fineness between about 350 m$^2$/kg and about 550 m$^2$/kg, a D90 between about 11 μm and about 50 μm, and a total combined iron oxide, manganese oxide, and chromium oxide content of less than 1.0% by weight;

at least one light color pozzolan selected from white silica fume, metakaoline, ground pumice, and ground volcanic ash and having a Blaine fineness greater than the Blaine fineness of the white Portland cement, a D90 less than the D90 of the white Portland cement, and a total combined iron oxide, manganese oxide, and chromium oxide content of less than 3.0% by weight; and at least one light color particulate material selected from ground granulated blast furnace slag (GGBFS), Class C fly ash, ground limestone powder, and ground marble.

In some embodiments, the Blaine fineness of white Portland cement in a dry blended cement composition and/or when initially added to a fresh cementitious mixture is between about 375 m$^2$/kg and about 550 m$^2$/kg, or between about 400 m$^2$/kg and about 500 m$^2$/kg, or between about 425 m$^2$/kg and about 475 m$^2$/kg.

In some embodiments, the D90 of white Portland cement in a dry blended cement composition and/or when initially added to a fresh cementitious mixture is between about 12 μm and about 45 μm, or between about 15 μm and about 40 μm, or between about 20 μm and about 35 μm.

In some embodiments, the white Portland cement in a dry blended cement composition and/or when initially added to a fresh cementitious mixture has a D10 greater than about 1.0 μm, or greater than about 1.2 μm, or greater than about 1.5 μm, or greater than about 1.8 μm, or greater than about 2.2 μm.

In some embodiments, the Blaine fineness of the light color pozzolan is between about 550 m$^2$/kg and about 30,000 m$^2$/kg, or between about 750 m$^2$/kg and about 22,000 m$^2$/kg, or between about 950 m$^2$/kg and about 15,000 m$^2$/kg, or between about 1200 m$^2$/kg and about 10,000 m$^2$/kg.

In some embodiments, the Blaine fineness of GGBFS, when included in a dry blended cement composition and/or when initially added to a fresh cementitious mixture, is between about 400 m$^2$/kg and about 750 m$^2$/kg, or between about 425 m$^2$/kg and about 700 m$^2$/kg, or between about 450 m$^2$/kg and about 650 m$^2$/kg, or between about 500 m$^2$/kg and about 600 m$^2$/kg.

In some embodiments, the D90 of GGBFS, when included in a dry blended cement composition and/or when initially added to a fresh cementitious mixture, is between about 5 μm and about 45 μm, or between about 7 μm and about 40 μm, or between about 10 μm and about 35 μm, or between about 12 μm and about 32 μm, or between about 15 μm and about 27 μm.

In some embodiments, the white Portland cement has a total combined transition metal oxide content of less than 1.0% by weight, or less than 0.9% by weight, or less than 0.8% by weight, or less than 0.7% by weight, or less than 0.6% by weight, or less than 0.5% by weight, or less than 0.4% by weight.

In some embodiments, the light color pozzolan has a total combined transition metal oxide content of less than 3.0% by weight, or less than 2.5% by weight, or less than 2.0% by weight, or less than 1.8% by weight, or less than 1.6% by weight, or less than 1.4% by weight, or less than 1.2% by weight, or less than 1.0% by weight, or less than 0.9% by weight, or less than 0.8% by weight.

In some embodiments, the other light color particulate material has a total combined transition metal oxide content of less than 3.0% by weight, or less than 2.5% by weight, or less than 2.0% by weight, or less than 1.8% by weight, or less than 1.6% by weight, or less than 1.4% by weight, or less than 1.2% by weight, or less than 1.0% by weight, or less than 0.9% by weight, or less than 0.8% by weight.

In some embodiments, white Portland cement comprises between about 20% and about 80%, or between about 30% and about 70%, or between about 35% and about 65%, or between about 40% and about 60%, or between about 45% and about 55%, by combined weight of the white Portland cement, light color pozzolan, and light color particulate material.

In some embodiments, the light color pozzolan and the light color particulate material comprise between about 20% and about 80%, or between about 30% and about 70%, or between about 35% and about 65%, or between about 40% and about 60%, or between about 45% and about 55%, by combined weight of the white Portland cement, light color pozzolan, and light color particulate material.

In some embodiments, the at least one light color pozzolan comprises between about 5% and about 70%, or between about 7% and about 60%, or between about 10% and about 50%, or between about 12% and about 40%, by combined weight of white cement, light color pozzolan, and other light color particulate material.

In some embodiments, the at least one other light color particulate material comprises between about 5% and about 70%, or between about 7% and about 60%, or between about 10% and about 50%, or between about 12% and about 40%, by combined weight of white cement, light color pozzolan, and other light color particulate material.

In some embodiments, white Portland cement has a reflectance value ("L value") or "brightness" of at least 75%, or at least 80%, or at least 85%, or at least 87%, or at least 88%, or at least 89%, or at least 90%.

In some embodiments, the light color pozzolan has a reflectance value of at least 70%, or at least 72%, or at least 75%, or at least 77%, or at least 80%, or at least 87%, or at least 89%, or at least 90%.

In some embodiments, the at least one other light color particulate material has a reflectance value of at least 70%, or at least 72%, or at least 75%, or at least 77%, or at least 80%, or at least 87%, or at least 89%, or at least 90%.

Because of the reduced quantity of white cement and the inclusion of the light color pozzolan and other white color particulate material, moldings and other cementitious compositions made using the cementitious composition disclosed herein are expected to have lower efflorescence compared to cementitious compositions in which the cementitious binder is purely white cement. Compared to OPC, white cement can have higher alkali content do to the use of fluxes and other reasons. As a result, while white cement can yield moldings that are initially very beautiful, efflorescence can result in long-term degradation of the beauty and structural integrity of moldings made using white cement as sole cementitious binder. The inclusion of a light color pozzolan, and optionally GGBFS, can significantly reduce or eliminate the incidence of efflorescence, perhaps because of its pozzolanic activity, which can bind and pacify alkali metal salts.

In some embodiments, the at least one light color particulate material is selected from GGBFS, ground limestone, ground marble, calcium carbonate, precipitated calcium carbonate (e.g., formed by passing $CO_2$ in flue gas through water comprising calcium ions and alkaline pH), calcined clay, calcine shale, industrial ash, Class C fly ash, ground glass, and mixtures thereof.

In some embodiments, the at least one light color particulate material in a dry blended cement composition and/or when initially added to a fresh cementitious mixture can have a Blaine fineness less than the Blaine fineness of the white Portland cement (although GGBFS advantageously has a Blaine fineness higher than that of the white Portland cement), and a D90 greater than the D90 of the white Portland cement. In some embodiments, the D50 and/or the D10 of the at least one light color particulate material is greater than the D50 and/or D10 of the white cement.

In some embodiments, the Blaine fineness of the at least one light color particulate material in a dry blended cement composition and/or when initially added to a fresh cementitious mixture is between about 50 $m^2$/kg and about 400 $m^2$/kg, or between about 75 $m^2$/kg and about 375 $m^2$/kg, or between about 100 $m^2$/kg and about 350 $m^2$/kg, or between about 125 $m^2$/kg and about 325 $m^2$/kg.

In some embodiments, the D90 of the at least one light color particulate material in a dry blended cement composition and/or when initially added to a fresh cementitious mixture is between about 40 μm and about 200 μm, or between about 45 μm and about 170 μm, or between about 50 μm and about 150 μm, or between about 55 μm and about 130 μm, or between about 60 μm and about 120 μm.

In some embodiments, the D10 of the at least one light color particulate material in a dry blended cement composition and/or when initially added to a fresh cementitious mixture is between about 1 μm and about 100 μm, or between about 3 μm and about 90 μm, or between about 5 μm and about 80 μm, or between about 8 μm and about 70 μm, or between about 12 μm and about 60 μm.

In order to individually control the particle size distribution (PSD) of each of the various cement, light color pozzolan, and light color particulate components, they are advantageously produced separately and blended together rather than being interground together. For example, it may be desirable for light color pozzolan (and GGBFS when included) to have Blaine fineness greater than and/or a D90 less than that of the white cement component. Because some pozzolans and GGBFS are typically harder than white cement clinker, intergrinding them together yields an interground blend in which the white cement component has higher fineness and lower D90 compared to the fineness and D90 of the pozzolan and/or GGBFS component(s), respectively. Grinding white cement clinker and granulated blast furnace slag separately and then blending them together permits control over the respective PSDs of the two components, including ensuring that the GGBFS is finer than and/or has a lower D90 than that of the white cement.

Similarly, SCMs can be softer than white cement and, when interground with white cement clinker, may higher fineness and lower D90 than that of the white cement. For example, where it is desired to include a white limestone powder that is coarser than the white cement, the two materials should be processed separately and then blended together.

In some embodiments, the cementitious compositions comprise a ternary blend of white cement, light color pozzolan and/or GGBFS that is finer than the white cement, and a coarse SCM (e.g., limestone powder) that is coarser than the white cement. The use of a coarse SCM is beneficial in order to increase particle packing density of the cement paste, which increases strength, reduces autogenous, plastic and drying shrinkage, reduces permeability, improves cohesiveness, and reduces bleeding and segregation. These qualities are beneficial for concrete in general, including precast concrete, stucco, GFRC, UHPC and SCC.

In some embodiments, the cementitious composition may further comprise at least one additive to improve chemical balance and strength, such as lime (CaO), dolomite lime (CaO.MgO), hydrated lime ($Ca(OH)_2$), hydrated dolomite lime ($Ca(OH)_2.Mg(OH)_2$), calcium sulfate hemihydrate (e.g., plaster of Paris), anhydrous calcium sulfate (e.g., anhydrite), calcium sulfate dihydrate (e.g., gypsum), or lithium sulfate. Calcium oxides and hydroxides can provide an early source of calcium ions to offset premature calcium depletion caused by pozzolanic reactions. Calcium sulfates can adjust sulfate balance to account for sulfate deficiencies caused by GGBFS and/or optional SCMs. Alkali metal sulfates, nitrates, or nitrites can be added but their use should be limited to avoid efflorescence and other problems associated with excessive amounts of alkali metal salts.

In some embodiments, the cementitious composition further comprises at least one aggregate selected from fine sand, medium sand, coarse sand, pea gravel, or coarse aggregate. In some embodiments, the at least one aggregate is selected from limestone, marble, dolomite, quartz, quartzite, pumice, shale, and polymers (e.g., post-consumer polystyrene foam beads or fragments).

In some embodiments, the cementitious composition further comprises fibers. Fibers can be used, for example, in high performance concrete. Glass fiber reinforced concrete (GFRC) can include glass fibers to increase fracture energy. In some cases, GFRC is formed by spraying a cementitious mixture onto a surface and permitting it to harden. In some embodiments, precast decorative concrete may include polymer fibers, such as polypropylene, polyvinyl alcohol or nylon fibers, to increase flexural strength and toughness. Ultra-high performance concrete (UHPC) often uses white cement to maintain higher quality, higher strength, and better aesthetics and can include steel fibers for internal reinforcement and to add ductility.

Examples of cementitious compositions within the scope of the disclosure are set forth below. The Examples includes mix designs and tables of comparative strength results. In many cases, cementitious compositions in which more than 50% of the white cement was replaced with light color SCMs had similar or greater strength than a standard mix comprising white cement as the only cementitious binder. It is believed that the selection of a white cement, light color pozzolan and/or GGBFS having a fineness greater than and/or D90 less than that of the white cement and/or limestone powder, synergistically interacted to yield hardened cementitious compositions of high strength even though the amount of white cement was reduced by 50% or more.

The blended white cement compositions disclosed herein can be used to replace white Portland cement in any desired application and are particularly well-suited for pre-cast concrete, stucco, glass fiber reinforced concrete (GFRC), and ultrahigh performance concrete (UHPC). In some embodiments, the water to cementitious binder ratio (w/cm) is less than 0.45, or less than 0.43, or less than 0.41, or less than 0.39, or less than 0.37, or less than 0.35, or less than 0.33, or less than 0.31, or less than 0.29. The water to cementitious binder ratio is advantageously determined based on the amount of water relative to the hydraulically reactive binder components in the cementitious mixture.

In order to achieve low w/cm mixes while maintaining flow, it is typically desirable to include superplasticizers, viscosity modifiers, and other flow aids known in the art of concrete, including pre-cast concrete, GFRC, UHPC, ready mixed concrete, and self-consolidating concrete (SCC). UHPC is itself often designed so as to be self-consolidating. Example admixtures include polycarboxylate ethers known in art, which are preferred over darker colored plasticizers and water reducers, such as lignosulfonates. Latex binders used to bind the cementitious compositions to polymer foam or other non-cementitious structures can sometimes improve the plasticity and flow of cementitious mixtures in addition to their adhesive properties. For example, latex binders based on polyvinyl acetate polymers and co-polymers have been found to further improve flow when used in small amounts in combination with a superplasticizer. A viscosity modifying agent (VMA) can be used to provide cohesiveness and moldability and to prevent bleeding and segregation. Examples include cellulosic ethers known in the art (e.g., Methocel).

Non-reactive components, such as coarse limestone particles coarser than typical cement particles (i.e., particles larger than about 50 µm), can be excluded from the mass balance of cementitious binder when determining the water to cementitious binder ratio (w/cm). Limestone particles smaller than 50 µm may, on the other hand, be counted toward the "cement" content for purposes of determining the w/cm. Limestone particles larger than, e.g., 50 µm are considered to be part of the aggregate content for purposes of determining the w/cm but limestone particles of all sizes may nevertheless be considered to constitute an SCM and form part of the "cement paste" when smaller than about 200 µm. Limestone and other non-reactive SCM particles can be considered to be "paste aggregates" because they are hardly discernable as ordinary aggregates but are intermixed within the cement paste. In the context of the present invention, they have been shown to increase the strength of the cement paste and overall cementitious composition and therefore contribute to cement paste volume and strength. Adding limestone powder can increase the overall powder content, which also reduces the tendency of the cementitious composition to experience bleeding or segregation, improving workability, cohesiveness, finishability, and overall performance.

It is postulated that coarse limestone particles increase the strength of the cement paste by filling a niche and effectively extending the continuity of the particle size distribution (PSD) of hydraulic cement and SCM particles from a maximum of 50 µm, as is typical for Portland cement in general and white Portland cement used in precast, GFRC, UHPC and SCC applications in particular, to a maximum particle size of at least 60 µm, 70 µm, 80 µm, 90 µm, 100 µm, 110 µm, 120 µm, 130 µm, 140 µm, or 150 µm, and up to 200 µm, 250 µm, or 300 µm. This broadening of the PSD of the cementitious binder particles, including white Portland cement, light color pozzolan and/or GGBFS, and coarse SCM particles, substantially increases the particle packing density of particles in the cement paste from a typical packing density of 50% or less to upwards of 57% or greater, such as at least 58%, 60%, 62%, 65%, 70% or 75%. This, in turn, significantly reduces the amount of inter-particle spacing, which is otherwise occupied by water or air in a freshly mixed cementitious composition. Reducing the amount of inter-particle spacing causes the cement and/or GGBFS particles to be statistically closer together at a given w/cm, flow and/or superplasticizer content. This, in turn, yields denser cement pastes of higher strength compared to cement pastes in the absence of coarse filler particles.

EXAMPLES

The following examples are given by way of illustration to demonstrate that reductions of up to 50% or more of Portland white cement are possible while maintaining or increasing the compressive strength of hardened cementitious compositions made from the inventive compositions. The white cement was obtained from Lehigh cement and reportedly had a Blaine of 417.3 $m^2$/kg, a percent passing at 325 mesh (44 µm) of 96.5% (for an estimated D90 of about 36-39 µm), a brightness (L) of 93.1, and an iron oxide ($Fe_2O_3$) content of 0.2%.

The white silica fume was produced by Trinic and purchased from Silica Systems Inc. Very little product information was available other than the product was white, appeared to have a brightness of at least 85%, and was described as having a particle size $1/100^{th}$ the size of Portland cement (presumably a majority of the particles are <1 µm in size, so that the D90 is presumably 1 µm or less).

The GGBFS was obtained from Lehigh cement from a source in Japan and reportedly had Blaine of 550 $m^2$/kg, a percent passing at 21 µm of 91.7%, a percent passing at 18 µm of 87.8% (for an estimated D90 of about 20 µm), an iron oxide ($Fe_2O_3$) content of 0.6%, a manganese oxide (MnO) content of 0.1%, and titanium dioxide ($TiO_2$) content of 0.6%. This GGBFS was very light colored, was substantially finer than the white cement, and had a D90 that was nearly half the D90 of the white cement. The whiteness of the GGBFS was estimated by inspection to be between about 70-80 on the brightness scale.

The "fine limestone powder" used in some of the examples had a PSD of approximately 5 µm to 50 µm and was considered to be a "cementitious SCM" and part of the cementitious binder for purposes of determining the w/cm. It had a brightness of about 92%. The "coarse limestone powder" identified in some of the Examples is the same material identified as "fine limestone sand", which reportedly had a brightness of 92% and less than 0.1% iron oxide ($Fe_2O_3$). The fine limestone sand reportedly had 96.7% passing at 212 µm, 89.6% passing at 150 µm, 72.5% passing at 106 µm, 52.1% passing at 75 µm. Based on these numbers, it is estimated that the fine limestone sand had approximately 20-25% passing at 50 µm. As such, about 20-25% of the fine limestone sand was deemed to constitute "cementitious SCM particles" for purposes of determining the w/cm of the paste, an estimated 70-75% of the fine limestone sand had particle sizes between 50-150 µm and therefore constituted "cement paste aggregate", and approximately 10% of the fine limestone sand had particle sizes greater than 150 µm and was therefore considered to form part of the non-paste aggregate, together with the coarser sand particles.

Examples 1-10

Decorative Stone Precast

Example 1 (control mix) was a standard cementitious mixture used to make precast limestone moldings for commercial sale with a design strength of 8000 psi (55.2 MPa) at 28 days. Examples 2-9 were compositions made according to the present invention and had greatly reduced white Portland cement (clinker) content, with comparable or superior strengths at similar water-to-cementitious binder ratio (w/cm). The amount of sand components in Examples 2-10 was modified to maintain the same volume of cementitious mixture as Example 1. The mix designs and strength results for Examples 1-10 are set forth below in Tables 1 and 2.

The cementitious mixtures were prepared using a Hobart mixer and made into 2-inch mortar cubes according to ASTM C109. After mixing the ingredients together (except for PVA fibers) following the procedure specified in ASTM C109, the PVA fibers were mixed at low speed until distributed throughout the cementitious mixture to avoid breaking or fraying the fibers. The flow was estimated to be approximately 100-110 (as would be measured using a standard flow table).

Each cementitious mixture was placed into nine 2-inch mortar cube mold cavities in two stages, with the mold cavities first being filled half-way, followed by tamping using a rubber tool as specified in ASTM C109, followed by filling the cavities completely, tamping again using the rubber tool, and then leveling off the cube mold surfaces using a steel trowel. The molds were covered with thin plastic film, and moist towels were placed over the plastic film to completely cover the tops and sides of the molds and the surface around the molds to prevent evaporation of water from the molds during initial setting and curing.

After 1 day, the hardened cubes were removed from the cube molds and cured in a saturated lime water bath maintained at room temperature. The cubes remained in the saturated lime water bath until tested for compressive strength using a standard hydraulic press for testing mortar cubes and concrete cylinders, including a computerized data gathering processor and numeric readout. Three of the nine cubes were tested at each of 3-, 7- and 28-day intervals as specified by ASTM C109. The hydraulic press was located at and operated by CMT Engineering, Inc. in West Valley City, Utah, which tabulated and reported the compressive strengths. The compressive strength of each cementitious mixture was determined to be either (1) the average of compressive strength values of three cubes at each time interval or (2) the average of the top two cube strength values (throwing out the lowest value as being less representative of the true strength of the cementitious composition).

TABLE 1

| Components/Compressive Strength | Examples | | | | |
|---|---|---|---|---|---|
| | 1 | 2 | 3 | 4 | 5 |
| White cement (g) | 1180 | 472.00 | 472.00 | 472.00 | 531.00 |
| Clinker reduction (%) | 0% | 60% | 60% | 60% | 55% |
| Light color GGBFS (g) | 0 | 472.00 | 472.00 | 472.00 | 531.00 |
| Limestone powder (g) | 0 | 236.00 | 118.00 | 106.20 | 95.58 |
| Baghouse fine glass (g) | 0 | 0 | 118.00 | 0 | 0 |
| Hydrated lime (g) | 0 | 0 | 0 | 23.60 | 11.80 |
| Latex adhesive (g) | 36.88 | 36.88 | 36.88 | 30.24 | 23.63 |
| Water (g) | 424.06 | 424.06 | 424.06 | 347.73 | 385.90 |
| Coarse limestone sand (g) | 590.00 | 554.60 | 554.60 | 666.70 | 601.80 |
| Fine limestone sand (g) | 313.44 | 294.63 | 294.63 | 354.18 | 319.71 |
| Medium limestone sand (g) | 497.81 | 467.94 | 467.94 | 562.53 | 507.77 |
| PVA fiber (g) | 6.50 | 6.50 | 6.50 | 6.50 | 6.50 |
| Superplasticizer (ml) | 2.2 | 2.2 | 2.2 | 2.2 | 4.0 |
| VMA (g) | 0.2 | 0.2 | 0.2 | 0.2 | 0.2 |
| w/c | 0.36 | 0.90 | 0.90 | 0.74 | 0.73 |
| w/cm | 0.36 | 0.45 | 0.40 | 0.36 | 0.36 |
| w/p | 0.36 | 0.36 | 0.36 | 0.32 | 0.33 |
| 3-day (psi/MPa) | 6340/43.7 | 4685/32.3 | 4176/28.8 | 5042/34.8 | 6473/44.6 |
| | 6415/44.2 | 4883/33.7 | 4240/29.2 | 5132/35.4 | 6685/46.1 |
| 7-day (psi/MPa) | 7425/51.2 | 5960/41.1 | 5640/38.9 | 7133/49.2 | 7708/53.1 |
| | 7488/51.6 | 6030/41.6 | 5910/40.7 | 7255/50.0 | 7793/53.7 |
| 28-day (psi/MPa) | 8458/58.3 | 7353/50.7 | 8003/55.2 | 7780/53.6 | 10000/68.9 |
| | 8660/59.7 | 7410/51.1 | 8145/56.2 | 7925/54.6 | 10230/70.5 |

VMA—viscosity modifying agent
w/c = water to cement ratio
w/cm = water to cementitious binder ratio
w/p = water to powder ratio
top strength value is average of 3 cubes; bottom value is average of 2 strongest cubes
Note:
for Example 1, first cubes tested at 4 days, not 3 days

TABLE 2

| Components/Compressive Strength | Examples | | | | |
|---|---|---|---|---|---|
| | 6 | 7 | 8 | 9 | 10 |
| White cement (g) | 525.69 | 534.22 | 525.69 | 460.48 | 477.94 |
| Clinker reduction (%) | 55% | 55% | 55% | 61% | 59% |
| Light color GGBFS (g) | 525.69 | 534.22 | 525.69 | 460.48 | 477.94 |
| Hydrated lime (g) | 10.62 | 5.37 | 0 | 25.79 | 18.38 |
| Latex adhesive (g) | 23.20 | 30.54 | 36.88 | 29.47 | 31.25 |
| Water (g) | 386.66 | 385.90 | 381.66 | 368.38 | 365.44 |

TABLE 2-continued

| Components/Compressive Strength | Examples | | | | |
|---|---|---|---|---|---|
| | 6 | 7 | 8 | 9 | 10 |
| Coarse limestone sand (g) | 613.60 | 637.20 | 554.60 | 552.57 | 601.80 |
| Fine limestone sand (g) | 354.18 | 131.44 | 294.63 | 515.73 | 319.71 |
| Medium limestone sand (g) | 562.53 | 537.64 | 467.94 | 552.57 | 507.77 |
| PVA fiber (g) | 6.50 | 6.50 | 6.50 | 6.50 | 6.50 |
| Superplasticizer (ml) | 2.7 | 2.7 | 2.6 | 3.0 | 2.6 |
| VMA (g) | 0.1 | 0.1 | 0 | 0.05 | 0.05 |
| w/c | 0.74 | 0.72 | 0.73 | 0.80 | 0.76 |
| w/cm | 0.36 | 0.36 | 0.36 | 0.39 | 0.38 |
| 3-day (psi/MPa) | 6420/44.3 | 5783/32.3 | 3843/28.8 | 5637/34.8 | 7058/44.6 |
| | 6750/46.5 | 5875/33.7 | 3910/29.2 | 5695/35.4 | 7247/46.1 |
| 7-day (psi/MPa) | 7407/51.1 | 8268/41.1 | 6713/38.9 | 8303/49.2 | 8413/53.1 |
| | 7465/51.5 | 8383/41.6 | 6757/40.7 | 8360/50.0 | 8475/53.7 |
| 28-day (psi/MPa) | 8640/59.6 | 8813/50.7 | 9913/55.2 | 9477/53.6 | 9608/68.9 |
| | 8727/60.2 | 8935/51.1 | 10135/56.2 | 9700/54.6 | 9677/70.5 |

VMA—viscosity modifying agent
w/c = water to cement ratio
w/cm = water to cementitious binder ratio
A portion of "fine limestone sand" was allocated to cementitious powder so w/p < w/cm top strength value is average of 3 cubes; bottom value is average of 2 strongest cubes Example 1 contained white cement as the sole binder and had an expected white or off-white coloring. Examples 2-10, when freshly mixed, formed cementitious mixtures that were slightly less white and perceptibly darker than Example 1. After curing and being permitted to surface dry, the color of the hardened cubes were virtually indistinguishable from the hardened cubes of Example 1. This shows that either a "natural" uncolored precast limestone molding can be made using the mixtures of Examples 2-9 or they can be colored using substantially the same amount(s) of pigment(s) as would be added to mixture of Example 1 to yield a precast limestone molding of desired color. Because of the reduced quantity of white cement and the inclusion of GGBFS, and optionally recycled glass or hydrated lime, moldings made using the mixtures of Examples 2-10 would be expected to have lower efflorescence compared to Example 1.

Examples 1A-10A

Decorative Stone Precast

Any of Examples 1-10 is modified by substituting 1%, 3%, 5%, 7.5%, 10%, 12.5%, 15%, 20%, 25%, or 30% of cementitious binder with a light color pozzolan, such as white silica fume, metakaolin, ground pumice, ground volcanic ash, calcined white or off-white clay, and the like. Optimal strength and rheology are obtained when using 5-10% of an ultrafine pozzolan, such as white silica fume, or 5-15% of a very fine pozzolan such as ground pumice or ground volcanic ash having a D90 less than 20 µm, 17.5 µm, 15 µm, 12.5 µm, or 10 µm.

Examples 11-15

GFRC

Example 11 (control mix) was a standard cementitious mixture used to make glass fiber reinforced concrete (GFRC) for commercial sale with a design strength of 8000 psi (55.2 MPa) at 28 days. Examples 12-15 were compositions made according to the present invention and had greatly reduced white Portland cement (clinker) content, with superior strengths at similar water-to-cementitious binder ratio (w/cm). The coarse limestone powder was apportioned between "sand" and "cementitious powder." The amount of sand components in Examples 12-15 was modified to maintain the same volume of cementitious mixture as Example 11. The mix designs and strength results for Examples 11-15 are set forth below in Table 3.

The cementitious mixtures were prepared using a Hobart mixer and made into 2-inch mortar cubes according to ASTM C109. After mixing the ingredients together (except for PVA fibers) following the procedure specified in ASTM C109, the glass fibers were mixed at low speed until distributed throughout the cementitious mixture to avoid breaking or fraying the fibers. The flow was estimated to be approximately 100-110 (as would be measured using a standard flow table).

Each cementitious mixture was placed into nine 2-inch mortar cube mold cavities in two stages, with the mold cavities first being filled half-way, followed by tamping using a rubber tool as specified in ASTM C109, followed by filling the cavities completely, tamping again using the rubber tool, and then leveling off the cube mold surfaces using a steel trowel. The molds were covered with thin plastic film, and moist towels were placed over the plastic film to completely cover the tops and sides of the molds and the surface around the molds to prevent evaporation of water from the molds during initial setting and curing.

After 1 day, the hardened cubes were removed from the cube molds and cured in a saturated lime water bath maintained at room temperature. The cubes remained in the saturated lime water bath until tested for compressive strength using a standard hydraulic press for testing mortar cubes and concrete cylinders, including a computerized data gathering processor and numeric readout. Three of the nine cubes were tested at each of 3-, 7- and 28-day intervals as specified by ASTM C109. The hydraulic press was located at and operated by CMT Engineering, Inc. in West Valley City, Utah, which tabulated and reported the compressive strengths. The compressive strength of each cementitious mixture was determined to be either (1) the average of compressive strength values of three cubes at each time interval or (2) the average of the top two cube strength values (throwing out the lowest value as being less representative of the true strength of the cementitious composition).

TABLE 3

| Components/Compressive Strength | Examples | | | | |
|---|---|---|---|---|---|
| | 11 | 12 | 13 | 14 | 15 |
| White cement (g) | 1344.58 | 615.42 | 553.56 | 553.56 | 553.56 |
| Clinker reduction (%) | 0% | 54% | 59% | 59% | 59% |
| Light color GGBFS (g) | 0 | 615.42 | 553.56 | 553.56 | 553.56 |
| Ultrafine pumice (g) | 0 | 0 | 123.70 | 0 | 0 |
| Volcanic ash-limestone (g) | 0 | 0 | 0 | 123.70 | 0 |
| Light color UFFA (g) | 0 | 0 | 0 | 0 | 123.70 |
| Limestone powder (g) | 196.77 | 267.60 | 240.06 | 242.02 | 238.09 |
| Hydrated lime (g) | 0 | 0 | 6.19 | 6.19 | 6.19 |
| Latex adhesive (g) | 32.79 | 30.17 | 30.17 | 30.17 | 30.17 |
| Water (g) | 366.32 | 337.01 | 337.01 | 337.01 | 337.01 |
| Medium silica sand (g) | 426.33 | 447.65 | 447.65 | 447.65 | 447.65 |
| Medium-fine silica sand (g) | 623.10 | 654.25 | 654.25 | 654.25 | 654.25 |
| Glass fiber (g) | 98.38 | 98.38 | 98.38 | 98.38 | 98.38 |
| Superplasticizer (ml) | 23 | 23 | 23 | 23 | 23 |
| VMA (g) | 1.05 | 1.05 | 1.05 | 1.05 | 1.05 |
| w/c | 0.27 | 0.55 | 0.61 | 0.61 | 0.61 |
| w/cm | 0.27 | 0.27 | 0.27 | 0.29 | 0.27 |
| w/p | 0.25 | 0.25 | 0.25 | 0.25 | 0.25 |
| 3-day (psi/MPa) | 7253/50.0 | 7337/50.6 | 8403/57.9 | 6662/45.9 | 6125/42.2 |
| | 7385/50.9 | 7338/50.6 | 8540/58.9 | 6937/47.8 | 6285/43.3 |
| 7-day (psi/MPa) | 8180/56.4 | 9342/64.4 | 11377/78.4 | 11170/77.0 | 8017/55.3 |
| | 8235/56.8 | 9665/66.6 | 11565/79.7 | 11230/78.1 | 8225/56.7 |
| 28-day (psi/MPa) | 9563/65.9 | 11607/80.0 | 12167/83.4 | 12635/87.1 | 10790/74.4 |
| | 9705/66.9 | 11755/81.0 | 12250/84.5 | 12862/88.7 | 10960/75.6 |

VMA—viscosity modifying agent
ultrafine pumice has D50 = 3-4 μm
interground volcanic ash-limestone has D90 = 56 μm
UFFA has D90 = 10 μm
w/c = water to cement ratio
w/cm = water to cementitious binder ratio
w/p = water to powder ratio (half of coarse limestone powder allocated to cement; half to sand) top strength value is average of 3 cubes; bottom value is average of 2 strongest cubes Example 11 contained white cement as the sole binder and had an expected white or off-white coloring. Examples 12-15, when freshly mixed, formed cementitious mixtures that were slightly less white and perceptibly darker than Example 11. After curing and being permitted to surface dry, the color of the hardened cubes were virtually indistinguishable from the hardened cubes of Example 11. This shows that either a "natural" uncolored GFRC material can be made using the mixtures of Examples 12-15 or they can be colored using substantially the same amount(s) of pigment(s) as would be added to mixture of Example 11 to yield a GFRC material of desired color. Because of the reduced quantity of white cement and the inclusion of GGBFS, and optionally pumice, interground volcanic ash-limestone, ultrafine fly ash, or hydrated lime, GFRC made using the mixtures of Examples 12-15 would be expected to have lower efflorescence compared to Example 11.

Examples 11A-15A

GFRC

Any of Examples 11-15 is modified by substituting 1%, 3%, 5%, 7.5%, 10%, 12.5%, 15%, 20%, 25%, or 30% of cementitious binder with a light color pozzolan, such as white silica fume, metakaolin, ground pumice, ground volcanic ash, calcined white or off-white clay, and the like. Optimal strength and rheology are obtained when using 5-10% of an ultrafine pozzolan, such as white silica fume, or 5-15% of a very fine pozzolan such as ground pumice or ground volcanic ash having a D90 less than 20 μm, 17.5 μm, 15 μm, 12.5 μm, or 10 μm.

Examples 16-32

Decorative Stone Precast

Example 16 (control mix) was derived from the cementitious mixture of Example 1, except that Example 16 used a single type of medium silica sand instead of the coarse and medium limestone sands used in Example 1. Example 16 has a presumed design strength of 8000 psi (55.2 MPa) at 28 days. Examples 17-32 were compositions made according to the present invention and had greatly reduced white Portland cement (clinker) content, with comparable or superior strengths at similar water-to-cementitious binder ratio (w/cm). The amount of sand in Examples 17-32 was modified to maintain the same volume of cementitious mixture as Example 16. The mix designs and strength results for Examples 16-32 are set forth below in Tables 4-7.

The cementitious mixtures were prepared using a Hobart mixer and made into 2-inch mortar cubes according to ASTM C109. The flow for Example 16 was estimated to be approximately 140 (as would be measured using a standard flow table). The flow of Examples 17-32 was comparable.

Each cementitious mixture was placed into nine 2-inch mortar cube mold cavities in two stages, with the mold cavities first being filled half-way, followed by tamping using a rubber tool as specified in ASTM C109, followed by filling the cavities completely, tamping again using the rubber tool, and then leveling off the cube mold surfaces using a steel trowel. The molds were covered with thin plastic film, and moist towels were placed over the plastic film to completely cover the tops and sides of the molds and the surface around the molds to prevent evaporation of water from the molds during initial setting and curing.

After 1 day, the hardened cubes were removed from the cube molds and cured in a saturated lime water bath maintained at room temperature. The cubes remained in the saturated lime water bath until tested for compressive strength using a standard hydraulic press for testing mortar cubes and concrete cylinders, including a computerized data gathering processor and numeric readout. Three of the nine cubes were tested at each of 3-, 7- and 28-day intervals as specified by ASTM C109. The hydraulic press was located at and operated by CMT Engineering, Inc. in West Valley City, Utah, which tabulated and reported the compressive strengths. The compressive strength of each cementitious mixture was determined to be either (1) the average of compressive strength values of three cubes at each time interval or (2) the average of the top two cube strength values (throwing out the lowest value as being less representative of the true strength of the cementitious composition).

TABLE 4

| Components/Compressive Strength | Examples | | | | |
|---|---|---|---|---|---|
| | 16 | 17 | 18 | 19 | 20 |
| White cement (g) | 1180 | 472.00 | 413.00 | 413.00 | 531.00 |
| Clinker reduction (%) | 0% | 60% | 65% | 65% | 55% |
| Light color GGBFS (g) | 0 | 472.00 | 472.00 | 472.00 | 413.00 |
| Light color UFFA (g) | 0 | 0 | 59.00 | 0 | 0 |
| Baghouse fine glass (g) | 0 | 0 | 0 | 59.00 | 0 |
| Limestone powder (g) | 0 | 212.40 | 212.40 | 212.40 | 212.40 |
| Hydrated lime (g) | 0 | 23.60 | 23.60 | 23.60 | 5.90 |
| Water (g) | 424.06 | 424.06 | 424.06 | 424.06 | 424.06 |
| Medium silica sand (g) | 1410 | 1320 | 1330 | 1350 | 1350 |
| Superplasticizer (ml) | 2.2 | 2.2 | 2.0 | 2.0 | 2.0 |
| VMA (g) | 0.5 | 0.4 | 0.32 | 0.32 | 0.2 |
| w/c | 0.36 | 0.90 | 1.03 | 1.03 | 0.80 |
| w/cm | 0.36 | 0.44 | 0.44 | 0.44 | 0.44 |
| w/p | 0.36 | 0.36 | 0.36 | 0.36 | 0.36 |
| 3-day (psi/MPa) | 5737/39.6 | 4887/33.7 | 4688/32.3 | 3520/24.3 | 4613/31.8 |
| | 5900/40.7 | 5260/36.3 | 4762/32.8 | 3545/24.4 | 4755/32.8 |
| 7-day (psi/MPa) | 6847/47.2 | 7233/49.9 | 6208/42.8 | 6461/44.6 | 5991/41.3 |
| | 7010/48.3 | 7375/50.8 | 6625/45.7 | 6692/46.1 | 6147/42.4 |
| 28-day (psi/MPa) | 8313/57.3 | 9282/64.0 | 8325/57.4 | 9047/62.4 | 7792/53.7 |
| | 8380/57.8 | 9400/64.8 | 8463/58.4 | 9105/62.8 | 7830/54.0 |

VMA—viscosity modifying agent
w/c = water to cement ratio
w/cm = water to cementitious binder ratio
w/p = water to powder ratio
top strength value is average of 3 cubes; bottom value is average of 2 strongest cubes

TABLE 5

| Components/Compressive Strength | Examples | | | | |
|---|---|---|---|---|---|
| | 21 | 22 | 23 | 24 | 25 |
| White cement (g) | 590.00 | 509.76 | 472.00 | 472.00 | 472.00 |
| Clinker reduction (%) | 50% | 57% | 60% | 60% | 60% |
| Light color GGBFS (g) | 354.00 | 509.76 | 472.00 | 472.00 | 472.00 |
| Glass <70 mesh (g) | 0 | 0 | 0 | 236.00 | 111.50 |
| Limestone powder (g) | 230.10 | 254.88 | 460.20 | 236.00 | 224.20 |
| Hydrated lime (g) | 5.90 | 0 | 0 | 0 | 11.80 |
| Water (g) | 424.06 | 420.55 | 341.37 | 424.06 | 424.06 |
| Medium silica sand (g) | 1350 | 1250 | 1300 | 1090 | 1350 |
| Superplasticizer (ml) | 2.0 | 3.0 | 6.0 | 2.5 | 2.0 |
| VMA (g) | 0.18 | 0.19 | 0.6 | 0.13 | 0.13 |
| w/c | 0.72 | 0.82 | 0.72 | 0.90 | 0.90 |
| w/cm | 0.45 | 0.41 | 0.36 | 0.36 | 0.40 |
| w/p | 0.36 | 0.33 | 0.24 | 0.30 | 0.33 |
| 3-day (psi/MPa) | 4708/32.5 | 5650/39.0 | 6600/45.5 | 3127/21.6 | 3858/26.2 |
| | 4923/33.9 | 5740/39.6 | 6930/47.8 | 3235/22.3 | 3867/26.7 |
| 7-day (psi/MPa) | 6462/44.6 | 7060/48.7 | 8136/56.1 | 4110/28.3 | 5240/36.1 |
| | 664/45.8 | 7215/49.7 | 8315/57.3 | 4260/29.4 | 5355/36.9 |
| 28-day (psi/MPa) | 8023/55.3 | 8150/56.2 | 10227/70.5 | 5027/34.7 | 6850/47.2 |
| | 8140/56.1 | 8230/56.7 | 10325/71.2 | 5140/35.4 | 6910/47.6 |

VMA—viscosity modifying agent
w/c = water to cement ratio
w/cm = water to cementitious binder ratio
w/p = water to powder ratio
top strength value is average of 3 cubes; bottom value is average of 2 strongest cubes

TABLE 6

| Components/Compressive Strength | Examples | | | | |
|---|---|---|---|---|---|
| | 26 | 27 | 28 | 29 | 30 |
| White cement (g) | 472.00 | 472.00 | 472.00 | 413.00 | 354.00 |
| Clinker reduction (%) | 60% | 60% | 60% | 60% | 60% |
| Light color GGBFS (g) | 472.00 | 472.00 | 472.00 | 472.00 | 531.00 |
| Volcanic ash-limestone (g) | 212.40 | 0 | 0 | 283.20 | 283.20 |
| Coarse fly ash (g) | 0 | 424.80 | 0 | 0 | 0 |
| Limestone powder (g) | 0 | 0 | 424.80 | 0 | 0 |
| Hydrated lime (g) | 23.60 | 23.60 | 23.60 | 11.80 | 11.80 |
| Water (g) | 424.06 | 347.73 | 347.73 | 424.06 | 424.06 |
| Medium silica sand (g) | 1320 | 1250 | 1320 | 1304 | 1300 |
| Superplasticizer (ml) | 2.02 | 6.0 | 4.0 | 2.2 | 1.5 |
| VMA (g) | 0.4 | 0.6 | 0.4 | 0.2 | 0.1 |
| w/c | 0.72 | 0.82 | 0.72 | 0.90 | 0.90 |
| w/cm | 0.45 | 0.41 | 0.36 | 0.36 | 0.40 |
| w/p | 0.36 | 0.33 | 0.24 | 0.30 | 0.33 |
| 3-day (psi/MPa) | 6670/46.0 | 3837/26.5 | 5053/34.8 | 5028/34.7 | 4820/33.2 |
| | 6770/46.7 | 3955/27.3 | 5165/35.6 | 5133/35.4 | 4960/34.2 |
| 7-day (psi/MPa) | 8743/60.3 | 7330/50.5 | 7023/48.4 | 5778/39.9 | 5240/36.1 |
| | 8775/60.5 | 7670/52.9 | 7140/49.2 | 5903/40.7 | 5345/36.9 |
| 28-day (psi/MPa) | 9667/66.7 | 8910/61.4 | 8502/58.6 | 7493/51.7 | 7123/49.1 |
| | 9735/67.1 | 9025/62.2 | 8585/59.2 | 7520/51.8 | 7293/50.3 |

VMA—viscosity modifying agent
interground volcanic ash-limestone has D90 = 56 μm
coarse fly ash had D10 = 20 μm
w/c = water to cement ratio
w/cm = water to cementitious binder ratio
w/p = water to powder ratio
top strength value is average of 3 cubes; bottom value is average of 2 strongest cubes

TABLE 7

| Components/Compressive Strength | Examples | |
|---|---|---|
| | 31 | 32 |
| White cement (g) | 523.92 | 523.92 |
| Clinker reduction (%) | 56% | 56% |
| Light color GGBFS (g) | 523.92 | 523.92 |
| Limestone powder (g) | 253.11 | 0 |
| Volcanic ash-limestone (g) | 0 | 246.62 |
| Hydrated lime (g) | 0 | 13.10 |
| Water (g) | 378.92 | 381.27 |
| Medium silica sand (g) | 1320 | 1314 |
| Superplasticizer (ml) | 2.0 | 2.8 |
| VMA (g) | 0.2 | 0.3 |
| w/c | 0.72 | 0.73 |
| w/cm | 0.36 | 0.32 |
| w/p | 0.29 | 0.29 |
| 3-day (psi/MPa) | 6708/46.3 | 6720/46.3 |
| | 6788/46.8 | 6870/47.4 |
| 7-day (psi/MPa) | 8522/58.8 | 8623/59.5 |
| | 8630/59.5 | 8685/59.9 |
| 28-day (psi/MPa) | 9812/67.7 | 10587/73.0 |
| | 9997/68.9 | 10670/73.6 |

VMA—viscosity modifying agent
interground volcanic ash-limestone has D90 = 56 μm
w/c = water to cement ratio
w/cm = water to cementitious binder ratio
w/p = water to powder ratio
top strength value is average of 3 cubes; bottom value is average of 2 strongest cubes Example 16 contained white cement as the sole binder and had an expected white or off-white coloring. Examples 17-32, when freshly mixed, formed cementitious mixtures that were slightly less white and perceptibly darker than Example 16. After curing and being permitted to surface dry, the color of the hardened cubes were virtually indistinguishable from the hardened cubes of Example 16. This shows that either "natural" uncolored molded objects can be made using the mixtures of Examples 17-32 or they can be colored using substantially the same amount(s) of pigment(s) as would be added to mixture of Example 16 to yield molded objects of desired color. Because of the reduced quantity of white cement and the inclusion of GGBFS, and optionally interground volcanic ash-limestone, fly ash, or hydrated lime, molded objects made using the mixtures of Examples 17-32 would be expected to have lower efflorescence compared to Example 16.

Examples 16A-32A

Decorative Stone Precast

Any of Examples 16-32 is modified by substituting 1%, 3%, 5%, 7.5%, 10%, 12.5%, 15%, 20%, 25%, or 30% of cementitious binder with a light color pozzolan, such as white silica fume, metakaolin, ground pumice, ground volcanic ash, calcined white or off-white clay, and the like. Optimal strength and rheology are obtained when using 5-10% of an ultrafine pozzolan, such as white silica fume, or 5-15% of a very fine pozzolan such as ground pumice or ground volcanic ash having a D90 less than 20 μm, 17.5 μm, 15 μm, 12.5 μm, or 10 μm.

Example 33

A cementitious composition comprises the following components:

| | |
|---|---|
| White Cement | 575 g |
| GGBFS | 575 g |
| White Silica Fume | 115 g |
| Marble White 80 (limestone) | 240 g |
| Sand (silica and/or limestone) | 1100 g |
| Water | 336 g |
| Superplasticizer (Viscocrete 2100) | 2 ml |
| Viscosity Modifying Agent | 0.5 g |

The composition has good flow and cohesiveness that permits it to be molded or sprayed. When cured, the composition has very high strength (i.e., more than 13,000 psi at 28 days).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A cementitious composition comprising a dry blend of:
   white Portland cement having a Blaine fineness between about 350 m$^2$/kg and about 550 m$^2$/kg, a D90 between about 11 µm and about 50 µm, and a total combined iron oxide, manganese oxide, and chromium oxide content of less than 1.0% by weight;
   at least one pozzolan selected from white silica fume, metakaolin, ground pumice, and ground volcanic ash and having a Blaine fineness greater than the Blaine fineness of the white Portland cement, a D90 less than the D90 of the white Portland cement, and a total combined iron oxide, manganese oxide, and chromium oxide content of less than 3.0% by weight; and
   at least one particulate material selected from ground granulated blast furnace slag (GGBFS), Class C fly ash, ground limestone powder, and ground marble.

2. The cementitious composition of claim 1, wherein the Blaine fineness of the white Portland cement is between about 400 m$^2$/kg and about 550 m$^2$/kg.

3. The cementitious composition of claim 1, wherein the D90 of the white Portland cement is between about 12 µm and about 45 µm, and wherein the white Portland cement has a D10 greater than 1.0 µm.

4. The cementitious composition of claim 1, wherein the Blaine fineness of the light color pozzolan is between about 550 m$^2$/kg and about 30,000 m$^2$/kg.

5. The cementitious composition of claim 1, wherein the white Portland cement has a total combined transition metal oxide content of less than 1.0% by weight.

6. The cementitious composition of claim 1, wherein the pozzolan has a total combined transition metal oxide content of less than 3.0% by weight.

7. The cementitious composition of claim 1, wherein the white Portland cement comprises between about 20% and about 80% by combined weight of the white Portland cement, the pozzolan, and the particulate material.

8. The cementitious composition of claim 1, wherein the white Portland cement has a reflectance value of at least 75%.

9. The blended cement composition of claim 1, wherein the light color pozzolan has a reflectance value of at least 70%.

10. The cementitious composition of claim 1, wherein the at least one particulate material has a total combined transition metal oxide content of less than 3.0% by weight.

11. The cementitious composition of claim 1, further comprising at least one additive selected from lime (CaO), dolomite lime (CaO.MgO), hydrated lime (Ca(OH)$_2$), hydrated dolomite lime (Ca(OH)$_2$.Mg(OH)$_2$), calcium sulfate hemihydrate, anhydrous calcium sulfate, calcium sulfate dihydrate, or lithium sulfate.

12. The cementitious composition of claim 1, further comprising at least one aggregate selected from fine sand, medium sand, coarse sand, pea gravel, coarse aggregate, and blends thereof.

13. The cementitious composition of claim 12, wherein the at least one aggregate is selected from limestone, marble, dolomite, marble, quartz, quartzite, pumice, polymers, and blends thereof.

14. The cementitious composition of claim 1, further comprising fibers selected from glass fibers, polypropylene fibers, polyvinyl alcohol fibers, nylon fibers, or blend thereof.

15. A cementitious mixture comprising mixture products of:
    water;
    white Portland cement having a Blaine fineness between about 350 m$^2$/kg and about 550 m$^2$/kg, a D90 between about 11 µm and about 50 µm, and a total combined iron oxide, manganese oxide, and chromium oxide content of less than 1.0% by weight;
    at least one pozzolan selected from white silica fume, metakaolin, ground pumice, and ground volcanic ash and having a Blaine fineness greater than the Blaine fineness of the white Portland cement, a D90 less than the D90 of the white Portland cement, and a total combined iron oxide, manganese oxide, and chromium oxide content of less than 3.0% by weight; and
    at least one particulate material selected from ground granulated blast furnace slag (GGBFS), Class C fly ash, ground limestone powder, and ground marble.

16. The cementitious mixture of claim 15, wherein the cementitious composition is selected from precast concrete, stucco, glass fiber reinforced concrete (GFRC), ultra-high performance concrete (UHPC), or self-consolidating concrete (SCC).

17. A hardened cementitious composition comprising reaction products of the cementitious mixture of claim 15.

18. A method of manufacturing a cementitious composition comprising:
    providing white Portland cement prepared by grinding white cement clinker in a mill together with gypsum to produce the white Portland cement having a Blaine fineness between about 350 m$^2$/kg and about 550 m$^2$/kg, a D90 between about 11 µm and about 50 µm, and a total combined iron oxide, manganese oxide, and chromium oxide content of less than 1.0% by weight;
    providing at least one pozzolan selected from white silica fume, metakaoline, ground pumice, and ground volcanic ash and having a Blaine fineness greater than the Blaine fineness of the white Portland cement, a D90 less than the D90 of the white Portland cement, and a total combined iron oxide, manganese oxide, and chromium oxide content of less than 3.0% by weight;
    providing at least one particulate material selected from ground granulated blast furnace slag (GGBFS), Class C fly ash, ground limestone powder, and ground marble; and
    blending the white Portland cement, the at least one light color pozzolan, and the at least one particulate material.

19. The method of claim 18, wherein the cementitious composition is a dry preblend.

20. The method of claim 18, further comprising blending water with the cementitious composition to form a freshly mixed composition.

* * * * *